United States Patent [19]

Fouquet

[11] Patent Number: 5,143,418
[45] Date of Patent: Sep. 1, 1992

[54] FLOORING PANELS FOR FLAT PLATFORM TRAILERS

[76] Inventor: Robert J M. Fouquet, 4701 Cove Cliff Road, North Vancouver, Canada, V7G 1H7

[21] Appl. No.: 696,225

[22] Filed: May 6, 1991

Related U.S. Application Data

[62] Division of Ser. No. 446,381, Dec. 5, 1989, Pat. No. 5,041,322.

[51] Int. Cl.⁵ .............................................. B62D 21/02
[52] U.S. Cl. ..................................... 296/182; 296/204; 105/422; 52/721; 52/177; 428/106; 428/141
[58] Field of Search ................. 296/182, 204; 105/422; 52/177, 721, 630; 428/106, 141

[56] References Cited

U.S. PATENT DOCUMENTS

| | | | |
|---|---|---|---|
| 2,565,251 | 8/1951 | Malmstrom | 428/106 |
| 3,163,461 | 12/1964 | Troy | 296/204 X |
| 3,319,393 | 5/1967 | Tantlinger et al. | 296/182 X |
| 3,578,375 | 5/1971 | Finefrock | 296/39.1 |
| 3,792,895 | 2/1974 | Paulson | 296/204 |
| 4,226,465 | 10/1980 | McCullough | 296/182 |
| 4,245,863 | 1/1981 | Carter et al. | 296/39.2 |
| 4,352,520 | 10/1982 | Sleiglmaier et al. | 296/182 |
| 4,505,508 | 3/1985 | Carter et al. | 296/39.2 |
| 4,555,292 | 11/1985 | Thompson | 156/279 |
| 4,656,809 | 4/1987 | Wilson | 52/795 |
| 4,787,669 | 11/1988 | Wante | 296/182 |
| 4,838,605 | 6/1989 | Abromavage | 296/182 |

FOREIGN PATENT DOCUMENTS

| | | |
|---|---|---|
| 524559 | 5/1956 | Canada . |
| 661053 | 4/1963 | Canada . |
| 864513 | 2/1971 | Canada . |
| 722280 | 3/1932 | France . |
| 1297276 | 5/1962 | France . |
| 2122008 | 7/1972 | France . |
| 664185 | 10/1983 | Switzerland . |

OTHER PUBLICATIONS

Metsaliiton Plywood Container Floors Nov. 5, 1982.

*Primary Examiner*—Robert R. Song
*Attorney, Agent, or Firm*—Banner, Birch, McKie & Beckett

[57] ABSTRACT

A composite panel particularly for use as a decking material in trailers and trucks is fabricated from at least eleven plies of wood veneer bonded together in a unitary structure. The three outer plies on each side of the panel are oriented with the wood grain extending in the longitudinal direction of the panel, the next outermost layer on each side being oriented with the grain extending in the transverse direction of the panel, and central layers being oriented with the grain extending in a longitudinal direction. Each side of the panel is covered by a laminate overlay of resin impregnated cellulose sheets, the upper surface overlay being textured to provide a slip-resistant finish.

14 Claims, 4 Drawing Sheets

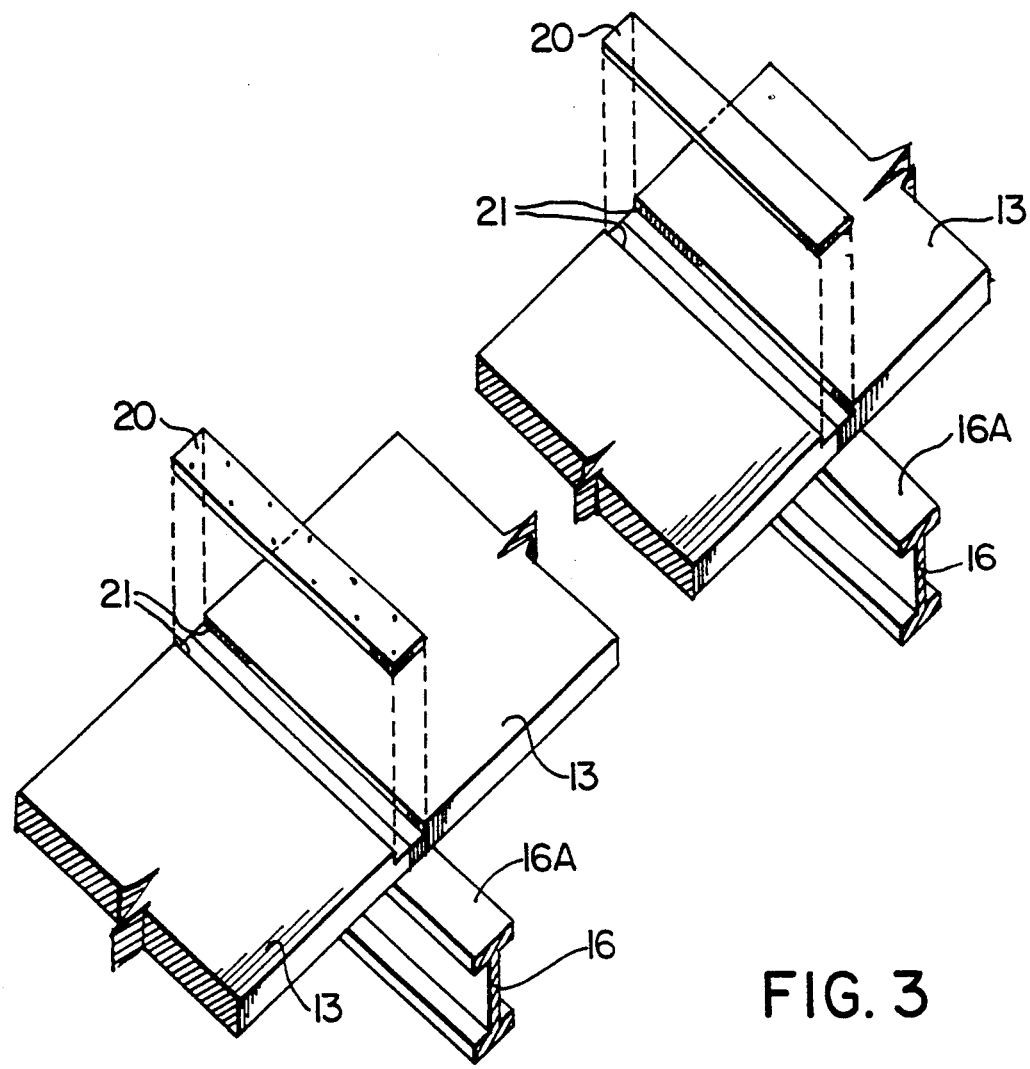
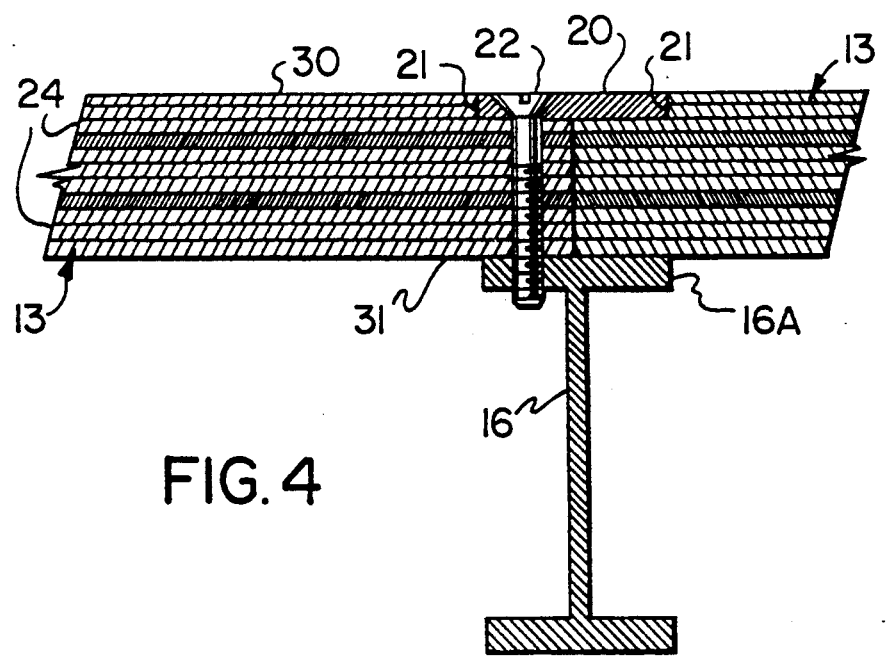
FIG. 3
FIG. 4

FLOORING PANELS FOR FLAT PLATFORM TRAILERS

This application is a division of application Ser. No. 07/446,381, filed Dec. 5, 1989, now U.S. Pat. No. 5,041,322.

BACKGROUND OF THE INVENTION

A. Field of the Invention

This invention relates to a new or improved composite panel structure for use as a decking material in trucks, trailers and other structures, and to such a platform structure incorporating the composite panel.

B. Description of the Prior Art

Over the years, various materials and composites have been used to provide flooring in trucks and trailers, but none has proved to be entirely satisfactory, whether from the point of view of cost, weight, strength, durability, or resistance to corrosion or moisture. Traditional plywood panels cannot meet the stringent performance requirements specific to the truck/trailer industry, particularly as regards strength, durability and resistance to moisture exposure, and other adverse and degrading conditions. Hardwood based products in solid timber form or glued-laminate form are currently used as flooring material in trucks and trailers, but these materials are heavy, not moisture resistant, expensive and of limited availability.

A typical trailer or truck flooring assembly as shown in the prior art employs predominantly 1⅛ in. or 1⅜ in. thick pieces of random length lumber with a width between 5 in. and 8 in. Other thicknesses (e.g. 1½ in.) are also used, although less frequently. The edges of individual pieces are machined to provide a profile such as shiplap, or tongue and groove. Individual pieces are thus assembled, side by side, and fastened to the supporting cross-members to constitute the flooring assembly.

Several species of wood are used for this application. The most widely used commercial species group is known as Apitong, and is otherwise referred to as Keruing. More than 70 individual species make up this group, and are widely scattered throughout the Indo-Malayan region, and some South American and African regions. Three principal characteristics inherent to the species of this group include: 1) superior structural strength, 2) superior resistance to wear, and 3) durability (i.e. decay resistance). From these characteristics, Apitong has established itself as the preferred material for use as flat platform trailer flooring. Softwood species of the Southern Yellow Pine group, Douglas Fir (*Pseudotsuga menziesii*), and Yellow Cedar (*Chamaecyparis nootkatensis*) are also used, although in limited volumes due to their poor durability characteristics, generally inferior structural properties when compared with hardwood species of the Apitong group, and poor surface resistance to wear. These species are used in somewhat less demanding applications, when weight optimization is a primary objective, and a limited life expectancy can be accepted.

Softwood plywood panels are also being used as flooring material, although to a very limited extent. Factors impeding wider acceptance and use of softwood plywood panels include: 1) their relatively inferior structural capabilities, considering the specific requirements for the particular end-use, 2) their poor wear resistance, and 3) their inherent sensitivity to conditions of moisture exposure.

Several attempts have also been made to develop plywood panels with surface coatings to improve resistance to wear. These attempts, however, have consistently failed to gain any sort of tangible recognition by flat platform trailer manufacturers, most probably owing to the inherent lower structural properties and moisture susceptibility of the panels. For essentially the same reasons, and perhaps because of economic considerations, hardwood plywood panels are generally not used as flooring material for flat platform trailers.

Two factors adversely affect the continued use of the Apitong resource over the long term. Firstly, the high relative density values of approximately 0.57 to 0.65 represent a significant weight disadvantage to an industry deeply concerned with optimization of the weight. More importantly, the continued market availability of tropical hardwoods is increasingly in question, as the source countries develop their domestic industries, other end-uses place new demands on the product, and finally as global environmental concerns regarding the harvesting of the tropical rain forests mount.

Although the softwood species of the Southern Yellow Pine group, Douglas Fir, and Yellow Cedar offer a weight advantage over Apitong, extensive use of lumber and plywood from these species is discouraged by their poor durability, poor surface resistance, and markedly inferior structural properties, as previously described.

SUMMARY OF THE INVENTION

The present invention provides a composite panel that can be used in a flooring assembly for a trailer or the like and that meets the structural, wear-resistance and durability requirements of the trailer manufacturing industry. The disclosed composite panel has an appreciable weight advantage over flooring products known in the prior art, and furthermore can utilize widely available softwood lumber resource.

More specifically, the present invention provides a composite panel comprising at least eleven plies of wood veneer bonded together to form a unitary structure, at least the three outer plies on each side of the panel being oriented such that the wood grain thereof extends in the same longitudinal direction, the next outermost ply on each side of the panel being oriented such that the wood grain thereof extends transverse to said longitudinal direction, said next outermost plies being separated by at least three interior plies oriented such that the wood grain thereof extends in said longitudinal direction, opposed major faces of said structure being coated and sealed by a resinimpregnated laminate overlay.

Preferably the overlay on at least one side of the panel is textured to provide a slip-resistant surface. The overlay preferably comprises a first cured cellulose sheet impregnated with a medium density resin and bonded to the outermost veneer ply, two outer cellulose sheets being impregnated with high density resin and bonded to the first cellulose sheet.

The panel itself may suitably comprise five interior plies each oriented with the wood grain extending in a longitudinal direction and sandwiched between two further plies oriented with the wood grain thereof extending in the transverse direction, and on each side three outer plies with the wood grain oriented in the longitudinal direction. The plies may be of any convenient thickness, for example ⅛ inch or 1/10 inch, and are preferably bonded together by a phenolic resin adhesive.

From another aspect the invention provides a method of manufacturing a composite panel comprising arranging a lay-up of at least eleven plies of wood veneer with at least the three outermost plies on each side of the lay-up being oriented with the wood grain thereof extending in the same longitudinal direction, the next outermost ply on each side being oriented such that the wood grain extends transverse to said longitudinal direction, and the interior plies between said next outermost plies being arranged with the wood grain thereof extending in said longitudinal direction; and bonding said plies together to form a panel; bonding to each major face on the panel a single cured cellulose sheet impregnated with a medium density resin; applying to each major face of the panel two uncured cellulose sheets impregnated with high density resin and applying heat and pressure to cure said high density resin and bond said two outer cellulose sheets to the composite.

The invention further provides a trailer or truck deck comprising: a base frame including a series of transversely extending joists arranged at a uniform close spacing in the longitudinal direction of the deck, and a series of rectangular panels arranged in abutting relationship overlying and secured to said joists, each panel being of composite layered wood veneer construction, of uniform thickness, and having a moisture impermeable coating on each of its major surfaces, the panels being arranged longitudinally such that they abut over said joists, the abutting ends of said panels being recessed to receive a metal strap that spans the abutting ends of the panels and is secured through them to the underlying joist by suitable fastening means.

BRIEF DESCRIPTION OF THE DRAWINGS

The invention will further be described by way of example only, with reference to the accompanying drawings wherein:

FIG. 3 is a fragmentary perspective view illustrating the means of attachment of the composite panels to the trailer framework;

FIG. 4 is a longitudinal sectional view to an enlarged scale of a portion of the trailer deck;

As shown in FIG. 1, a truck/trailer 11 has a horizontal deck 12 formed by a series of composite panels 13 arranged in abutting end-to-end configuration. As shown in FIGS. 2A and 2B, the trailer 11 has a pair of longitudinally extending parallel main frame beams 14 of I section, and is bounded by longitudinal edge beams 15 of channel section, the overall width of the trailer typically being about eight feet. These beams are interconnected by a series of closely spaced joists 16 extending transversely between the edge beams 15. These joists extend through apertures in the webs 14a of the main beams 14 and are positioned with their top surfaces beneath the underside of the top flanges 14b of the main beams and the top flanges 15b of the edge beams. The joists 16 are connected to the beams 14 and 15 by any suitable means, e.g. by welding, all the beams and joists preferably being of steel. Thus, the upper flanges 16a of the joists form a planar support grid for the panels 13, this surface being at a spacing below the top surface of the beams 14 and 15 that corresponds to the thickness of the panel, so that when installed, the panels are flush with those top surfaces, as indicated in FIG. 2B.

Figure 1:
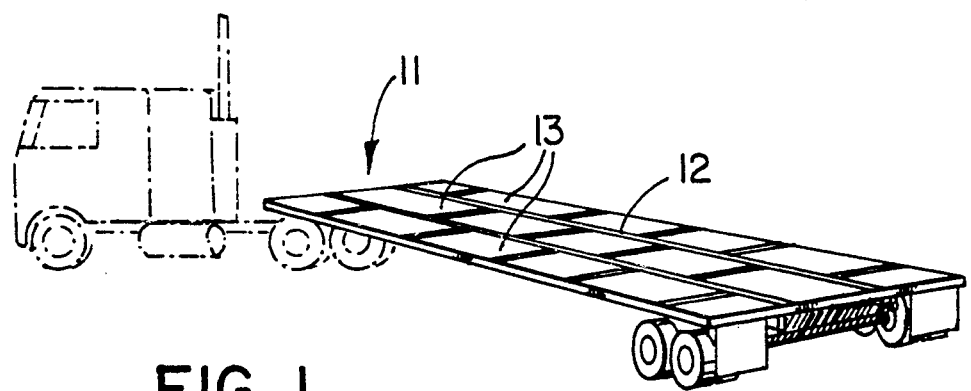
FIG. 1 is a somewhat schematic perspective view of a flat platform trailer having a decking comprised of composite panels in accordance with this invention.
Figure 2A:
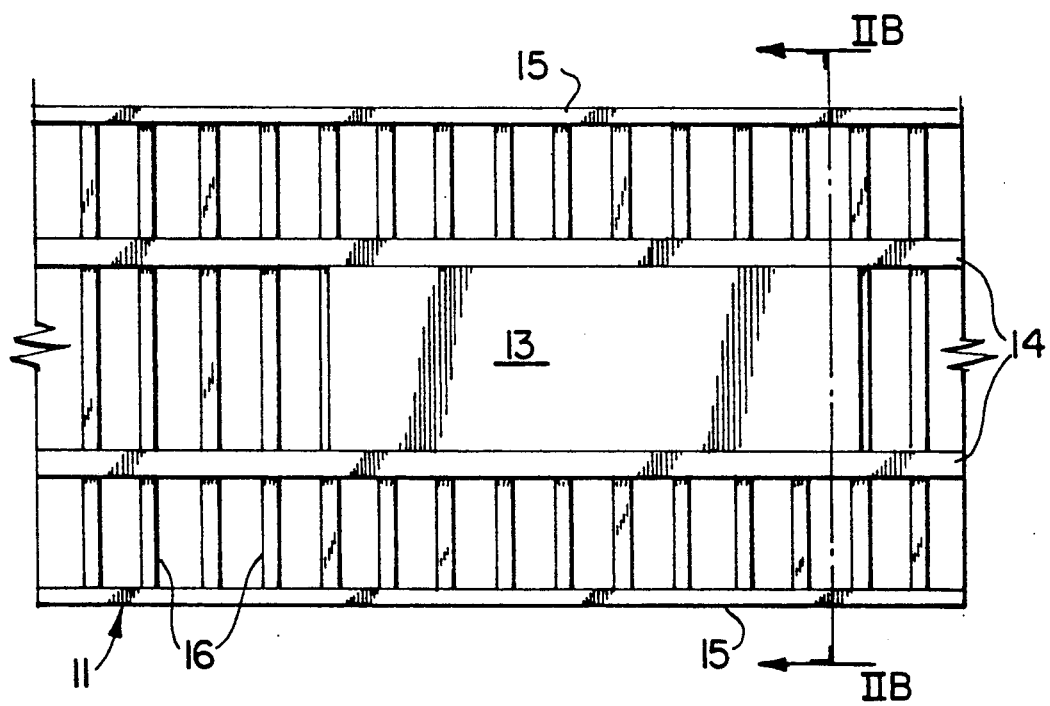
FIG. 2A is a plan view of part of the trailer deck illustrating the frame work thereof.
Figure 2B:
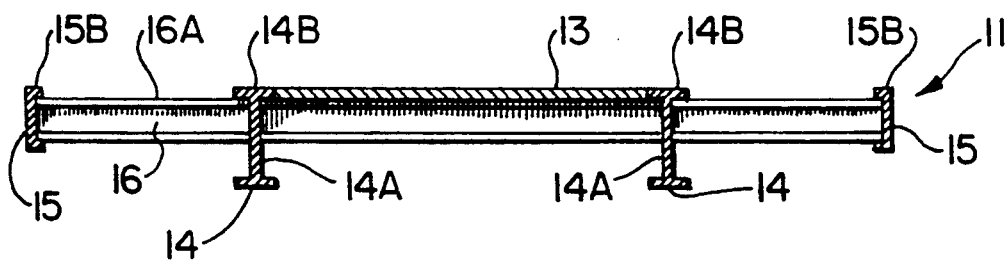
FIG. 2B is a sectional view taken on the line IIb—IIb in FIG. 2A.

The panels 13 are of rectangular outline and are arranged with their major dimension extending in the longitudinal direction of the deck 12. The relative dimensions of the panels and the trailer frame members are such that the width of the panels of the central row exactly matches the spacing between the flanges 14b of the main frame beams. The outer rows of panels have a width that exactly matches the spacing between the main beam flange 14b and the edge beam flange 15b. The panels are of a length that is a multiple of the spacing between adjacent joists 16 so that, as shown in FIGS. 2A and 3, each end of every panel is located on and supported by one of the joist upper flanges 16A.

As indicated in FIGS. 3 and 4, the ends of the panels 13 are secured to the joist flanges 16A by a fastening arrangement in the form of a transverse metal plate 20 which is received into rebates 21 formed along each end of each of the panels so that the upper surface of the plate 20 is flush with the top surface of the panels. The metal plates 20 are secured to the underlying flange 16b by countersunk screws 22 passing through the panel and in threaded engagement with the flange 16A. Thus the ends of each panel 13 are securely clamped against the underlying flange 16A.

Figure 5:
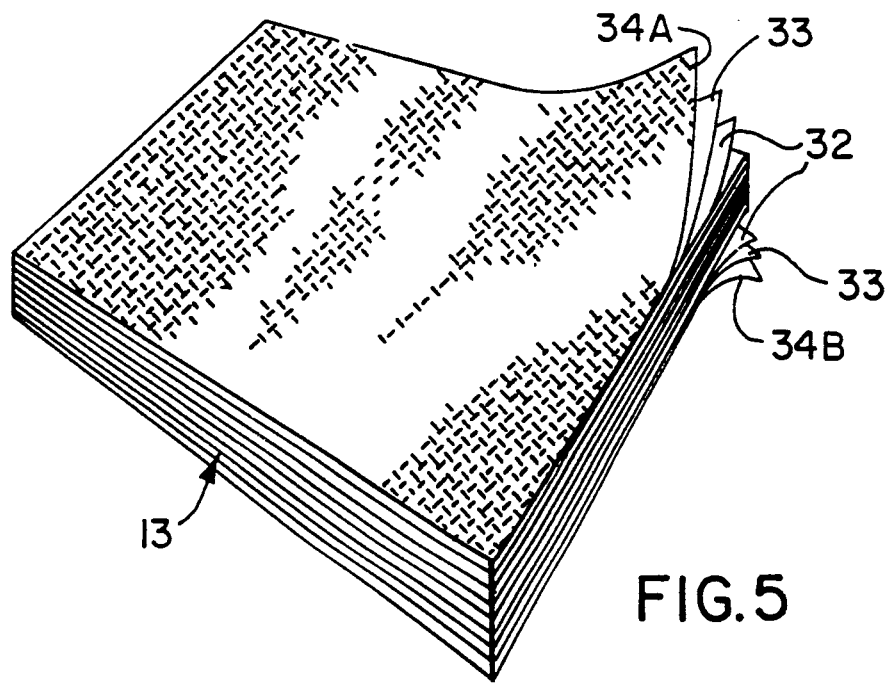
FIG. 5 is a perspective view of a composite panel in accordance with the invention.
Figure 6A:
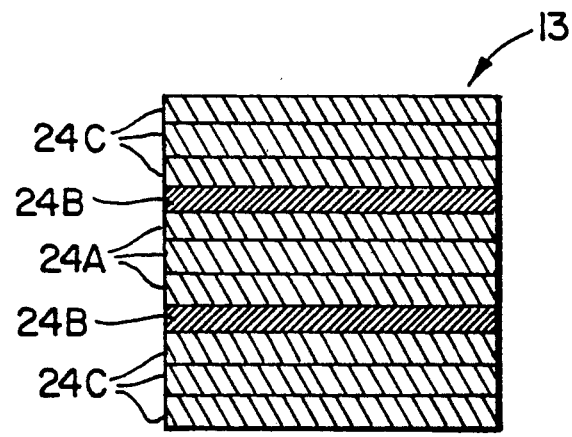
FIGS. 6A and 6B are fragmentary sectional views illustrating eleven ply panels.
Figure 6B:
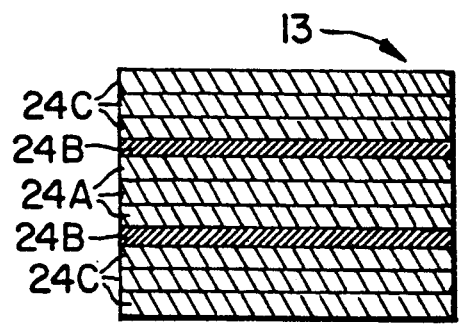
Figure 7:
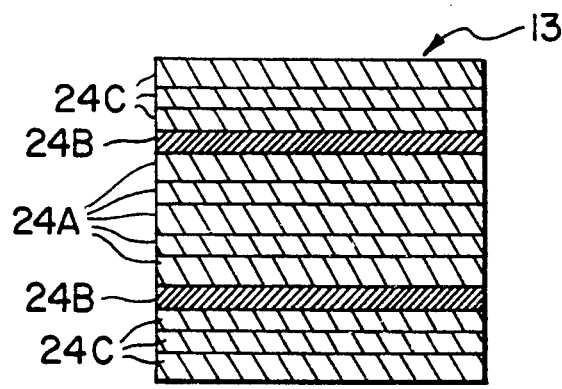
FIG. 7 is a fragmentary sectional view illustrating a thirteen ply panel.

The fabrication and structure of the composite panel 13 will now be described with reference to FIGS. 5 through 7. As shown in FIG. 6A, a laminated wood substrate is provided comprising a total of eleven plies 24 of wood veneer. There are three central plies 24a the wood grain of which extends in the longitudinal direction of the panel; two intermediate plies 24b arranged with the wood grain extending in the transverse direction of the panel and arranged one on each side of the central plies, and on each outer side three outer plies 24c all arranged with the wood grain extending in the longitudinal direction. The plies are bonded together using a suitable adhesive such as phenolic resin, using the same techniques of heat and pressure as used in the manufacture of plywood panels. These techniques are well known and need not be described here.

The thickness of the panel will of course depend upon the thickness of the plies 24 and the number of plies used. A panel of 1⅜ inch thickness is preferably constructed using eleven ⅛ inch thick plies as illustrated in FIG. 6A. A panel of 1⅛ inch thickness as shown in FIG. 6B is produced using eleven plies of 1/10 inch thickness. FIG. 7 illustrates a variant in which the panel 13 includes five central plies 24a, two intermediate plies 24b and six outer plies 24c, the plies being of various thicknesses as indicated to provide an overall panel thickness of 1⅜ inches.

The grain orientation of individual plies is important owing to the end-use condition and the high mechanical strength requirements. For the 11-ply construction and for both thicknesses (i.e. 1⅛ in. and 1⅜ in.), the three outer plies 24c on both the face and the back of the panel have a grain running in a direction parallel to the longitudinal direction of the panel. It is intended that this direction be perpendicular to the direction of the longitudinal axis of the trailer supporting cross member joists 16, as illustrated in FIG. 2A. This grain orientation provides the required panel flexural capacity. The intermediate fourth and eighth plies 24b (FIG. 6A, 6B) have a grain in a direction perpendicular to the longitudinal direction of the panel. With this grain orientation, dimensional stability is provided to the panel, and some degree of flexural capacity in a direction parallel to the supporting joists is developed. Finally, the three innermost plies 24a have a grain in a direction parallel to the longitudinal direction of the panel to permit the optimization of the planar shear capacity of the panel.

The preferred species of wood for the individual plies 24 is Douglas Fir. Any other species may however be used, providing the several requirements for the particular end-use as previously discussed can be met. The grade of individual plies and the species, may affect the dimensional stability of the panel, at the same time as they may impact on the manufacturing process inasmuch as bonds can be affected by species and grade characteristics.

An important aspect of the panel of the present invention lies in the laminate overlays that are provided on each side of the panel. The overlays are not shown in FIGS. 6A, 6B or 7, but are illustrated in FIGS. 4 and 5. Both the upper and lower overlay, 30, 31 respectively in FIG. 4, comprise a plurality of resin impregnated cellulose sheets that are adhered to the outer faces of the panel. Specifically, as shown in FIG. 5 there is an inner sheet 32 of cured cellulose material impregnated with medium density resin (hereinafter referred to as a Medium Density Overlay or MDO), an intermediate cellulose sheet 33 and an outer cellulose sheet 34a (top overlay) and 34b (bottom overlay). The sheets 33, 34a and 34b are uncured cellulose impregnated with high density resin (hereinafter referred to as High Density Overlay or HDO). An adhesive is employed to glue the MDO to the wood substrate, as the resin of the MDO is fully cured prior to the manufacture of the composite planar panel. In contrast, HDO sheets 33, 34a, 34b are not fully cured during their manufacture, and their resin component will be re-activated during manufacture of the composite planar panel as heat and pressure are applied, thus acting as an adhesive between the MDO sheet and the first HDO sheet, and between the two HDO sheets.

The MDO sheet 32 provides an intermediate layer that will receive the pattern necessary for developing a slip-resistant surface in the upper overlay 30. The two HDO sheets essentially fulfill two functions as 1) a moisture barrier, and 2) an improved abrasion resistant surface. In addition, although this is not the primary intent of the invention, the three layer overlay provides a mechanism for masking any defect that may be present on the outer surface of the wood substrate, thus enhancing the visual appearance of the resulting product.

Figure 8:
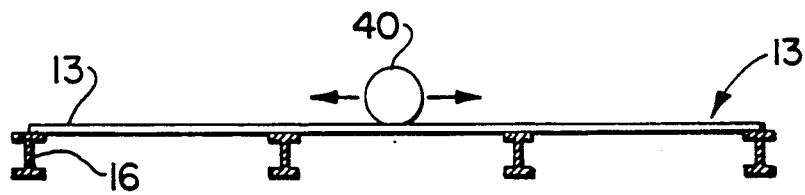
FIG. 8 is a diagram illustrating a loading condition of the trailer platform.
Figure 9:
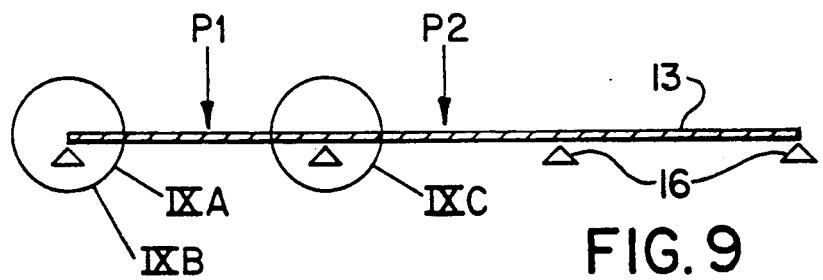
FIG. 9 is a loading diagram.
Figure 9A:
FIGS. 9A, 9B and 9C illustrate loading deformations of portions of the platform.
Figure 9C:
Figure 9B:

FIGS. 8 and 9 specifically illustrate a structural requirement that is particular to the intended end-use of the composite panel in the illustrated application as in a truck or trailer deck. As indicated schematically in FIG. 8, a critical loading configuration arising from the front wheel 40 of a loaded fork lift truck is illustrated as providing a moving point load. As the forklift travels on the trailer deck, the wheel 40 applies a point load which is represented in different positions by the arrows P1 and P2 in FIG. 9. The structural capacity of the panel 13 to resist loading at the central position of arrow P2 is referred to as the baseline capacity. The baseline capacity is not affected by boundary conditions arising from the connection of the panel ends to the joists 16. The panel capacity to resist loading at position P1 however will vary depending upon the type of connection between the panel and the trailer frame at the end of the panel. Where the panel ends are simply screwed to the joists, the resultant deflection is indicated at FIG. 9B. In this configuration a substantial decrease in the structural capacity of the panel (of the order of 25 percent of the baseline capacity) may be expected due to the repeated panel deformations around the screws, as a result of the moving loads. In contrast, a sandwich type of construction as illustrated in FIGS. 3 and 4 herein utilizing metal plates 20 screwed to the joists flanges 16A through the panel ends will minimize panel deformation around the screws 22, this condition being represented in FIG. 9A.

The plate 20 has a thickness of approximately ¼ inch and a width of 3 inches, the spacing between the adjacent screws 22 being not more than 4 inches at the ends of the panel. Screws 22 are also used to secure the panel to joist flanges 16A at intermediate locations in the lengths of the panels, and in this case the screw spacing should not exceed 8 inches. Preferably 5/16 inch diameter screws are used.

What I claim as my invention is:

1. A trailer or truck deck comprising:
a base frame including a series of transversely extending joists arranged at a uniform close spacing in the longitudinal direction of the deck, and a series of rectangular panels arranged in abutting relationship overlying and secured to said joists, each panel being of composite layered wood veneer construction, of uniform thickness, and having a moisture impermeable coating on each of its major surfaces, the panels being arranged longitudinally such that they abut over said joists, the abutting ends of said panels being recessed to receive a metal strap that spans the abutting ends of the panels and is secured through them to the underlying joist by suitable fastening means.

2. A trailer or truck deck according to claim 1 wherein the moisture impermeable coating on the upper surface of each panel is textured to provide a non-slip surface.

3. A trailer or truck deck according to claim 2 wherein said moisture impermeable coating comprises a cured cellulose sheet impregnated with medium density resin and bonded to the outermost veneer ply and covered by at least one cellulose sheet impregnated with high density resin.

4. A trailer or truck deck according to claim 1 wherein said panel comprises at least eleven wood veneer piles bonded together, at least the three outermost plies on each side of the panel being oriented such that the grain of the wood extends in the same longitudinal direction, the next outermost ply on each side of the panel being oriented such that the wood grain thereof extends transverse to said longitudinal direction, said next outermost plies being separated by at least three interior plies oriented such that the wood grain thereof extends in said longitudinal direction.

5. A trailer or truck deck according to claim 4 wherein said plies of the panels are of uniform thickness of about ⅛ inch or about 1/10 inch, and are bonded together by a phenolic resin adhesive.

6. A trailer or truck deck according to claim 1 wherein said joists are carried on a pair of laterally spaced longitudinally extending main frame beams of I-section having horizontal upper and lower flanges joined by an upright web, the top surfaces of said upper flanges being coplanar with the top surfaces of said panels.

7. A trailer or truck according to claim 6 wherein longitudinal edges of said panels abut each longitudinal edge of said upper flanges, and wherein said joists are fixedly secured to said beams and extend through apertures in the webs thereof.

8. A trailer or truck deck according to claim 1 wherein intermediate locations in the lengths of said panels are fastened to the underlying joists.

9. A trailer or truck deck comprising:
a base frame including a series of transversely extending joists arranged at a uniform close spacing in the longitudinal direction of the deck, and a series of rectangular panels arranged in abutting relationship overlying and secured to said joists, each panel being of composite layered wood veneer construction, of uniform thickness, having a moisture impermeable coating on each of its major surfaces and having its upper side textured to provide a non-slip surface, each said panel comprising at least eleven wood veneer plies bonded together, at least the three outermost plies on each side of the panel being oriented such that the grain of the wood extends in the same longitudinal direction, the next outermost ply on each side of the panel being oriented such that the wood grain thereof extends transverse to said longitudinal direction, said next outermost plies being separated by at least three interior plies oriented such that the wood grain thereof extends in said longitudinal direction; the panels being arranged longitudinally such that they abut over said joists, the abutting ends of the panels being secured to the underlying joist by suitable fastening means.

10. A trailer or truck deck comprising a base frame including a series of transversely extending joists arranged at a uniform close spacing in the longitudinal direction of the deck; a series of rectangular panels arranged in abutting relationship overlying and secured to said joists; said joists being carried on a pair of laterally spaced longitudinally extending main frame beams of I-section having horizontal upper and lower flanges joined by an upright web, the top surfaces of said upper flanges being coplanar with the top surfaces of said panels, each panel being of composite layered wood veneer construction, of uniform thickness, and having a moisture impermeable coating on each of its major surfaces, the moisture impermeable coating on the upper surface of each panel being textured to provide a non-slip surface, the panels being arranged longitudinally such that they abut over said joists and being secured to the underlying joist by suitable fastening means.

11. A trailer or truck according to claim 10 wherein longitudinal edges of said panels abut each longitudinal edge of said upper flanges, and wherein said joists are fixedly secured to said beams and extend through apertures in the webs thereof.

12. A trailer or truck deck according to claim 10 wherein the abutting ends of said panels are recessed to receive and be spanned by a metal strap that is secured through the abutting ends to the underlying joist by suitable fastening means.

13. A trailer or truck deck according to claim 10 wherein said panel comprises at least eleven wood veneer plies bonded together, at least the three outermost plies on each side of the panel being oriented such that the grain of the wood extends in the same longitudinal direction, the next outermost ply on each side of the panel being oriented such that the wood grain thereof extends transverse to said longitudinal direction, said next outermost plies being separated by at least three interior plies oriented such that the wood grain thereof extends in said longitudinal direction.

14. A trailer or truck deck according to claim 13 wherein said plies of the panels are of uniform thickness of about ⅛ inch or about 1/10 inch, and are bonded together by a phenolic resin adhesive.

* * * * *

UNITED STATES PATENT AND TRADEMARK OFFICE
CERTIFICATE OF CORRECTION

PATENT NO. : 5,143,418

DATED : September 1, 1992

INVENTOR(S) : Robert J-M Fouquet

It is certified that error appears in the above-identified patent and that said Letters Patent is hereby corrected as shown below:

In Column 6, Line 65 replace "piles" with --plies--

Signed and Sealed this

Fourth Day of May, 1993

Attest:

MICHAEL K. KIRK

Attesting Officer

Acting Commissioner of Patents and Trademarks